United States Patent [19]
Deguchi et al.

[11] 3,983,754
[45] Oct. 5, 1976

[54] APPARATUS FOR DETECTING MISFIRES IN MULTI-CYLINDER TYPE INTERNAL COMBUSTION ENGINES

[75] Inventors: Fujihiko Deguchi, Tokyo; Tadashi Nagai, Yokosuka; Shinichiro Sakurai; Makoto Ohguri, both of Tokyo, all of Japan

[73] Assignee: Nissan Motor Co., Ltd., Yokohama, Japan

[22] Filed: July 1, 1975

[21] Appl. No.: 592,223

[30] Foreign Application Priority Data
July 5, 1974 Japan................................ 49-76993

[52] U.S. Cl. ................................................. 73/346
[51] Int. Cl.² ........................................ G01M 15/00
[58] Field of Search.................... 73/116, 346, 341; 340/57; 60/277

[56] References Cited
UNITED STATES PATENTS

| | | | |
|---|---|---|---|
| 2,274,086 | 2/1942 | Morrison | 73/116 |
| 3,101,617 | 8/1963 | Brinson | 73/346 X |
| 3,472,068 | 10/1969 | List et al. | 73/346 |

*Primary Examiner*—Jerry W. Myracle

[57] ABSTRACT

A plurality of thermocouples or pressure responsive devices are provided in the exhaust system to detect a misfire in respective cylinders and the outputs of the thermocouples or pressure responsive devices are applied to a comparator for detecting the misfire. Alarm and fuel feed stopping devices are provided to operate when a misfire is detected.

5 Claims, 5 Drawing Figures

APPARATUS FOR DETECTING MISFIRES IN MULTI-CYLINDER TYPE INTERNAL COMBUSTION ENGINES

This invention relates to apparatus for detecting a misfire in a multi-cylinder type internal combustion engine wherein the condition of the exhaust gas related to the condition of combustion of an air-fuel mixture in each cylinder, for example the temperature or pressure of the exhaust gas or the temperature of the wall of the exhaust pipe or branch, is detected at each cylinder and the values detected at respective cylinders are compared to detect the abnormal condition, especially a misfire.

In the operation of an internal combustion engine where the air-fuel mixture admitted into the cylinder undergoes an abnormal combustion, especially a misfire, the exhaust gas contains a large quantity of a not yet burnt fuel component which not only causes pollution of the atmosphere but also decreases engine output, especially, in an internal combustion engine provided with a catalytic converter in the exhaust system for the purpose of cleaning the exhaust gas, upon occurrence of a misfire a large quantity of the not yet burnt fuel is quickly burnt in the catalytic converter thereby burning the catalyst or melting the casing of the converter. In an internal combustion engine provided with a thermal reactor in the exhaust system for the purpose of perfectly burning the not yet burnt fuel component contained in the exhaust gas, upon occurrence of a misfire, especially when the operation of the engine is confined under such misfire condition the exhaust gas will contain a large quantity of not yet burnt fuel component which is burnt in the thermal reactor so long as the engine operates, as a consequent, the temperature in the reactor rises to an abnormally high level which may melt the casing of the reactor.

It is an object of this invention to provide a novel apparatus for detecting a misfire in an internal combustion engine capable of obviating difficulties in prior art described hereinabove.

Another object of this invention is to provide a novel misfire detector capable of not only detecting the occurrence of the misfire but also of stopping supply of fuel to the particular cylinder in which a misfire has occurred.

According to this invention there is provided apparatus for detecting a misfire in a cylinder of a multi-cylinder type combustion engine comprising a plurality of detectors which detect the conditions related to the combustion conditions of the air-fuel mixture in respective cylinders of the engine, and a comparator for comparing the outputs of the detectors to detect a misfire in an engine cylinder.

The detectors may be of various forms, for example thermocouples installed in respective branches of exhaust manifolds or at the exhaust ports of respective cylinders or pressure responsive means installed in the exhaust system.

The invention can be more fully understood from the following detailed description taken in conjunction with the accompanying drawings in which.

Figure 1:
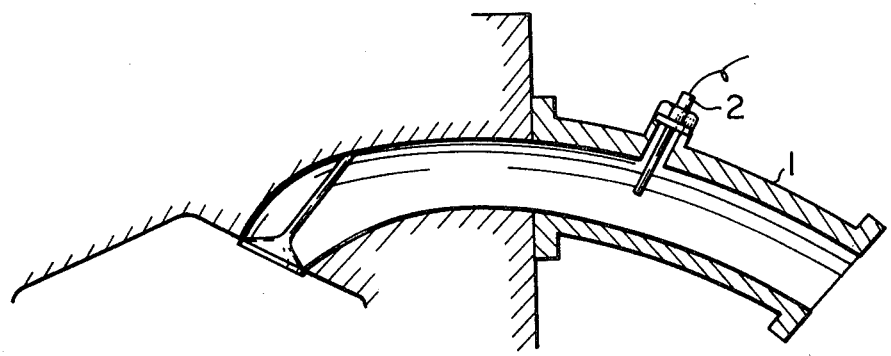
FIG. 1 is a longitudinal section sketch of an exhaust pipe on which a temperature detector is mounted.
Figure 2B:
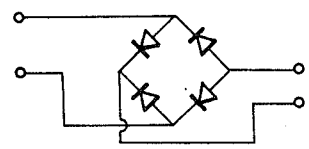
FIG. 2B shows the detail of a polarity switching circuit utilized in the apparatus shown in FIG. 2A.
Figure 2A:
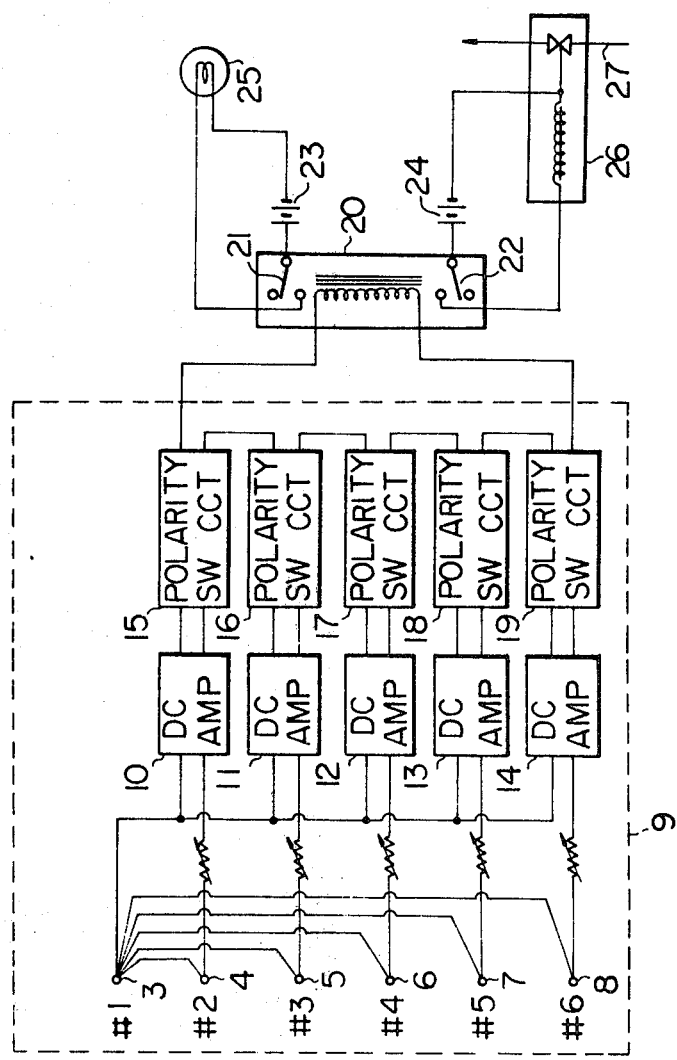
FIG. 2A is a block diagram of an apparatus according to this invention for detecting a misfire in a cylinder of an internal combustion engine.
Figure 3:
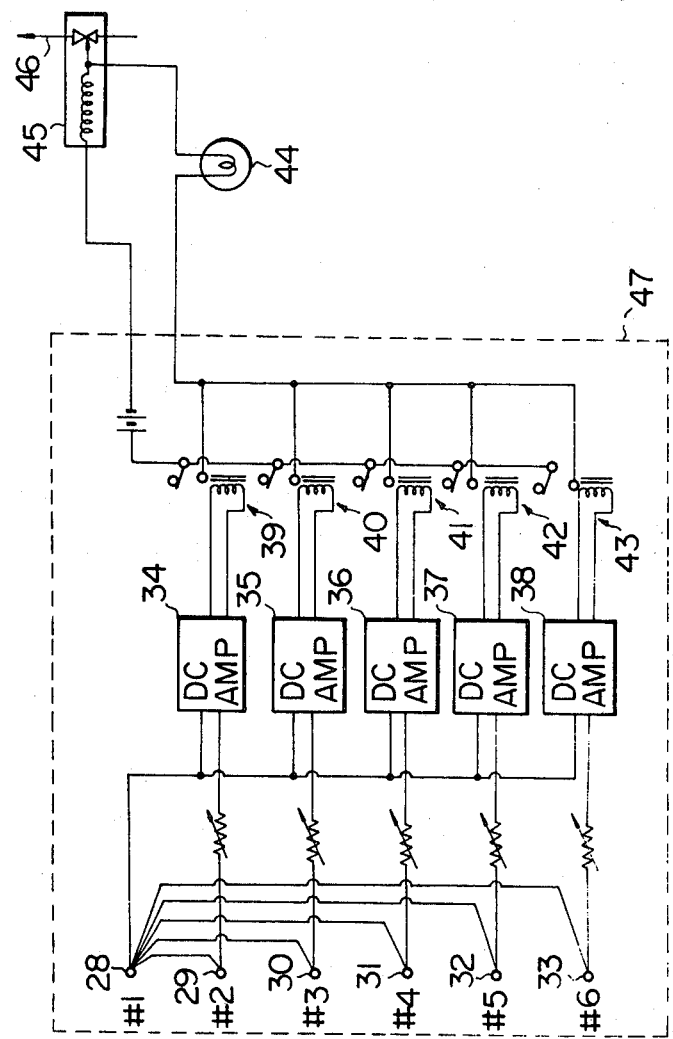
FIGS. 3 and 4 are block diagrams respectively showing modified embodiments of this invention.

FIGS. 1 to 3 show one embodiment of this invention in which the temperature of the exhaust system is utilized as a parameter to detect a misfire in a cylinder of an internal combustion engine. In this embodiment, a temperature detector 2 such as a thermocouple is mounted in each branch of an exhaust manifold 1 so as to detect the temperatures of the gases exhausted from respective cylinders (No. 1 to No. 6), when a misfire occurrs in one or more of the cylinders different magnitude of electromotive forces appear in loops of thermocouples formed between two of terminals 3 to 8. The voltages generated by the respective thermocouples are applied to a comparator 9 which includes DC amplifies 10 through 14 and polarity switching circuits 15 through 19. The output of the comparator 9 is applied to a coil of a relay 20 including switches 21 and 22 connected to sources of power 23 and 24 respectively. The switch 21 is used to energize an alarm lamp 25 mounted on the instrument panel or another place easy for the driver to see, whereas the switch 22 is used to energize a solenoid valve 26 positioned in a fuel supply pipe 27 extending between a fuel tank and a carburetor, not shown. In this embodiment, detection of the misfire is performed by detecting the difference between the electromotive forces of the thermocouple of the No. 1 cylinder which is taken as the reference, and the thermocouples of the other cylinders. However, as the polarity of the voltage difference varies in accordance with the relative magnitude of the temperatures of the exhaust gases discharged from respective cylinders the polarity switching circuits 15 to 19 are provided in the comparator 9. As shown in FIG. 2B, each polarity switching circuit comprises a full wave rectifier circuit.

Suppose now that the No. 2 cylinder is subjected to a misfire, then the temperature of the exhaust gas discharged from this cylinder is considerably below the temperature of the exhaust gas from the No. 1 cylinder in which a misfire does not occur. As a result, a voltage appears across terminals 3 and 4 of the thermocouples provided for the exhaust manifold branches of No. 1 and No. 2 cylinders, which is amplified by DC amplifier 10 and then applied to relay 20 through polarity switching circuit 15. Consequently switches 21 and 22 are closed to light alarm lamp 25 alarming the driver and to energize solenoid valve 26 for stopping the supply of fuel. Where a misfire occurs in another cylinder, an identical operation is performed.

Experiments made by the inventor show that the difference between the temperatures of the gas exhausted from a cylinder which has misfired and the gas exhausted from cylinders in which the combustion of the fuel is normal increases as the output of the engine increases and that the temperatures of the exhaust gases from respective cylinders are not always equal even when the combustion of the fuel is normal. In the embodiment shown in FIG. 2A, as the outputs from respective thermocouples are connected in parallel in the comparator the sum of the differences between the temperatures of the exhaust gases discharged from respective cylinders when the output of the engine is low is not greatly different from the difference between the temperatures of the gas exhausted from a cylinder which has misfired and that of the gases exhausted from the other cylinders in which the combustion of the fuel is normal so that the detection of the misfire is not accurate. However, when the engine is operating at a low output the temperature of the exhaust gas is low so that even when a misfire occurrs in one or more of the cylinders there is no risk of abnormally rising the temperature of the catalytic converter installed in the exhaust system. Rather, the temperature of the catalyst can be maintained at an adequate value by the reaction of the not yet burnt gas in the converter. Similar operation takes place where a thermal reactor is installed in the exhaust system.

In the embodiment shown in FIG. 3, relays 39 through 43 are provided the coils of which are connected across pairs of output terminals of DC amplifiers 34 through 38 whereby the accuracy of detecting the misfire is improved even when the output of the engine is low. The contacts of the relays are connected in parallel across a circuit containing a solenoid valve 45 for controlling the supply of the fuel flowing through a fuel supply pipe 46 and an alarm lamp 44 in circuit with the solenoid valve 45.

Figure 4:
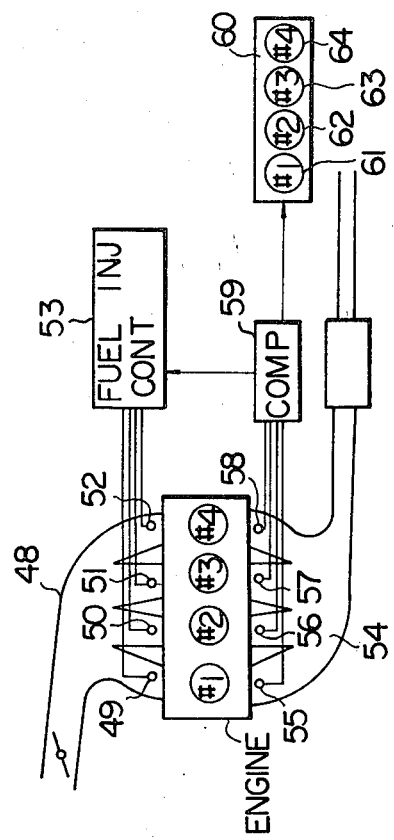

FIG. 4 is a diagram showing a novel apparatus for detecting a misfire in a multi-cylinder type internal combustion engine equipped with an electronically controlled fuel injection device, in which the apparatus is arranged to light only an alarm lamp corresponding to the cylinder which has misfired and to interrupt the supply of fuel to only that cylinder. More particularly, fuel injection valves 49, 50, 51 and 52 controlled by a fuel injection control device 53, are installed in the intake manifold 48 and temperature detectors 55, 56, 57 and 58 are installed in the exhaust manifold 54. The outputs of the temperature detectors are applied to a comparator 59 which compares these outputs. The output from the comparator 59 is supplied to the fuel injection control device 53 and to an alarm device 60 including alarm lamps 61, 62, 63 and 64 for respective cylinders.

The apparatus shown in FIG. 4 operates as follows: For example, when No. 1 cylinder misfires the temperature of the gas exhausted from that cylinder is detected by one of the temperature detectors and the outputs of all temperature detectors are sent to the comparator 59 to detect that No. 1 cylinder has misfired. The output from the comparator 59 is sent to the alarm device 60 for lighting the alarm lamp 61 corresponding to No. 1 cylinder and also to the fuel injection control device 53 to terminate the operation of the fuel injection valve 49 for stopping the supply of fuel to No. 1 cylinder. Instead of providing a plurality of alarm lamps for respective cylinders only one lamp may be provided in common for all cylinders.

Although in the embodiments described above, temperatures of the exhaust gases which are related to the combustion condition of the air-fuel mixture in respective cylinders are measured, it is also possible to detect the misfire condition of the engine by measuring the temperature at any portion of the engine, for example the temperatures at the exhaust ports or of the wall of the exhaust manifold branch of respective cylinders. It is also possible to detect the misfire condition by measuring the variation in the pressure of the exhaust gas by means of suitable pressure responsive means because the pressure of the exhaust gas from a cylinder which has misfired is lower than the pressure of the exhaust gas discharged from cylinders in which the combustion of the fuel is normal.

It is to be understood that the alarm lamps can be substituted by a buzzer or other alarm device and that the invention is also applicable to a rotary engine instead of a reciprocating engine.

As described hereinabove, the invention provided a simple and efficient apparatus four detecting a misfire condition in a cylinder of an internal combustion engine.

What is claimed is:

1. An apparatus for detecting a misfire in a multicylinder type internal combustion engine, which comprises:
    at least two comparators each for producing an output signal when there takes place a difference in condition between two of the exhaust gases respectively exhausted, through exhaust manifold branches, from the cylinders;
    at least two polarity switching circuits each for producing on two output terminals thereof a unidirectional output voltage in response to said output signal from the corresponding comparator, one polarity switching circuit having one output terminal thereof connected to one output terminal of the other polarity switching circuit;
    a solenoid having one terminal thereof connected to the remaining output terminal of said one polarity switching circuit and the other terminal thereof connected to the remaining output terminal of said the other polarity switching circuit; and
    a switch actuated when said solenoid is energized.

2. An apparatus according to claim 1, in which each of said polarity switching circuits includes a full-wave rectifier of a diode bridge.

3. An apparatus according to claim 1, in which said comparators includes:
    at least two thermocouples one of which has one junction thereof positioned within a first exhaust manifold branch and the other junction thereof positioned within a second exhaust manifold branch, the other thermocouple having one junction thereof positioned within said first exhaust manifold branch and the other junction thereof positioned within a third exhaust manifold branch; and
    at least two DC amplifiers respectively connected to said thermocouples for respectively producing output voltages in response to currents flowing in the associated thermocouples.

4. An apparatus for detecting a misfire in a multicylinder type internal combustion engine, each of the cylinders being connected, respectively to an exhaust manifold branch, which comprises:
    at least two thermocouples one of which has one junction thereof positioned within a first exhaust manifold branch and the other junction thereof positioned within a second exhaust manifold branch, the other thermocouple having one junction thereof positioned within said first exhaust manifold branch and the other junction thereof positioned within a third exhaust manifold branch;
    at least two DC amplifiers respectively connected to said thermocouples for respectively producing output voltages in response to currents flowing in the associated thermocouples; and
    a misfire detector connected to the output terminals of said DC amplifiers for detecting misfire in accordance with the output voltages from said DC amplifiers.

5. An apparatus according to claim 4, in which said misfire detector includes at least two solenoids having two terminals thereof respectively connected to the output terminals of the respective DC amplifiers; and at least two switches respectively associated with said solenoids and actuated when the associated solenoid is energized.

* * * * *